United States Patent [19]

Woodruff

[11] Patent Number: 4,519,908
[45] Date of Patent: May 28, 1985

[54] VALVE FOR CONTROL OF FLUID FLOW

[76] Inventor: Seth D. Woodruff, 4411 Via Amable, San Diego, Calif. 92122

[21] Appl. No.: 588,197

[22] Filed: Mar. 12, 1984

[51] Int. Cl.³ .............................................. B01D 35/02
[52] U.S. Cl. .................................... 210/287; 210/351; 210/429; 210/432; 138/43
[58] Field of Search ............... 210/429, 432, 435, 446, 210/451, 452, 454, 287, 351; 138/40, 43

[56] References Cited

U.S. PATENT DOCUMENTS

| | | | |
|---|---|---|---|
| 306,503 | 10/1884 | Maybuay | 210/432 |
| 1,482,021 | 1/1924 | Little | 138/43 |
| 2,327,195 | 8/1943 | Kosky et al. | 138/43 |
| 3,042,079 | 7/1962 | Swift et al. | 210/432 |
| 3,241,804 | 3/1966 | Bjorklund | 138/43 |
| 3,470,915 | 10/1969 | Bitzer et al. | 138/43 |
| 3,548,880 | 12/1970 | Katzer | 210/189 |
| 3,735,874 | 5/1973 | Steinman | 210/432 |

Primary Examiner—John Adee
Attorney, Agent, or Firm—Norman B. Rainer

[57] ABSTRACT

A valve is provided for precisely controlling fluid flow at low flow rates and simultaneously filtering said fluid. The valve employs a resilient porous filtering medium interposed in the flow path and capable of undergoing adjustable compression by means of a threaded shaft associated with an external handle. When the filtering medium is compressed, it provides greater occlusion of the flow path, thereby diminishing flow rate through the valve. The valve is readily dismantled to facilitate cleaning or replacement of the filtering medium.

4 Claims, 2 Drawing Figures

VALVE FOR CONTROL OF FLUID FLOW

BACKGROUND OF THE INVENTION

This invention relates to a device for controlling the flow of a fluid, and more particularly concerns a valve device for precise regulation of the rate of flow of a fluid within a confining conduit.

Valves of various designs have been proposed for regulating the flow of a fluid within a confining conduit. Most such valves involve a controllably movable member adapted to mate with a stationary member or seat. When the mating is complete, total blockage or closure is achieved, thereby preventing any flow of fluid through the valve. When the movable member is close to but not in contact with the seat, flow of fluid is permitted, but the effective cross-sectional area of passage through the valve is reduced considerably from the fully open position where the movable member and seat are at their maximum separation. Since the rate of flow of a fluid is dependent upon the cross-sectional area of a passageway at a given pressure drop across the passageway, the above-noted valve-produced restriction of said area achieves control of flow rate.

To function properly at very low flow rates, the geometrical configuration of the seat and movable member of a valve must be precisely matched to close tolerances. Not only is it costly to produce high precision valves, but the narrow spacings between the seat and movable member are conducive to damage by virtue of errosive and corrosive effects and deposits caused by the fluid, and mechanical damage due to overly forceful tightening of the valve. Once damaged, most valves are not easily repairable by the simple replacement of inexpensive parts.

In many conduit systems for conveying gaseous and liquid fluids, it is desirable to utilize filtration means to remove particulate solid impurities suspended within the fluid. The installation of such filtration means into a conduit system represents additional expense.

It is accordingly an object of the present invention to provide a valve for controlling fluid flow at a low rate without need for expensive precision fabrication, and which can remove particulate solid impurities from said fluid.

It is another object of the present invention to provide a valve as in the foregoing object relatively immune to damage by forceful overtightening, and capable of repair by facile replacement of inexpensive parts.

It is a still further object of the present invention to provide a valve of the aforesaid nature of simple and rugged construction which may be economically manufactured.

These objects and other objects and advantages of the invention will be apparent from the following description.

SUMMARY OF THE INVENTION

The above and other beneficial objects and advantages are accomplished in accordance with the present invention by an improved valve which comprises:

(a) an upper housing comprising an elongated main conduit of cylindrical configuration having an open lower threaded extremity and an upper extremity which is closed except for a passageway coaxially disposed with the axis of elongation of said main conduit, and a side conduit of cylindrical configuration communicating perpendicularly with said main conduit and terminating in a threaded distal extremity, (b) a lower housing having a circular cylindrical bore terminating in open upper and lower threaded extremities, the upper extremity of said lower housing being adapted to releasably join in a fluid impervious manner with the lower extremity of said upper housing to cause centering of said upper and lower housings upon said axis of elongation, and retaining means inwardly protruding into said cylindrical bore.

(c) a threaded shaft which extends through the passageway in the upper extremity of said upper housing, having a first extremity disposed above said upper housing, and an opposed second extremity, (d) a manipulating handle affixed to the first extremity of said threaded shaft, (e) a foot in swiveled engagement with the second extremity of said threaded shaft and having a flat lower face of circular periphery perpendicularly disposed to said axis of elongation, (f) upper and lower rigid porous boundary means of circular periphery perpendicularly disposed to said axis of elongation and positioned within the bore of said lower housing, said lower boundary means being supported by said retaining means, and said upper boundary means lying in abutment with the lower face of said foot and slideably positionable within said bore, and (g) a resiliently compressible porous filtering medium disposed between said boundary means, whereby (h) downward urging of said foot by said threaded shaft causes compression of said filtering medium which results in controlled occlusion of said cylindrical bore.

In a preferred embodiment of the valve of this invention, the filtering medium is an open-celled foam fabricated of resilient polymers having thermal and chemical resistance. Suitable polymers include polyurethane, neoprene, polybutadiene, and fluorine-containing elastomers. In alternative configurations, the filtering medium may be comprised of a bed of fibrous material derived from polymers or inorganic substances such as metals, carbon and glass. In the case of such fibrous media, the resiliency of the filtering medium may result from the physical interaction of the fibers and not upon any intrinsic resiliency of the fibers.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

Figure 2:
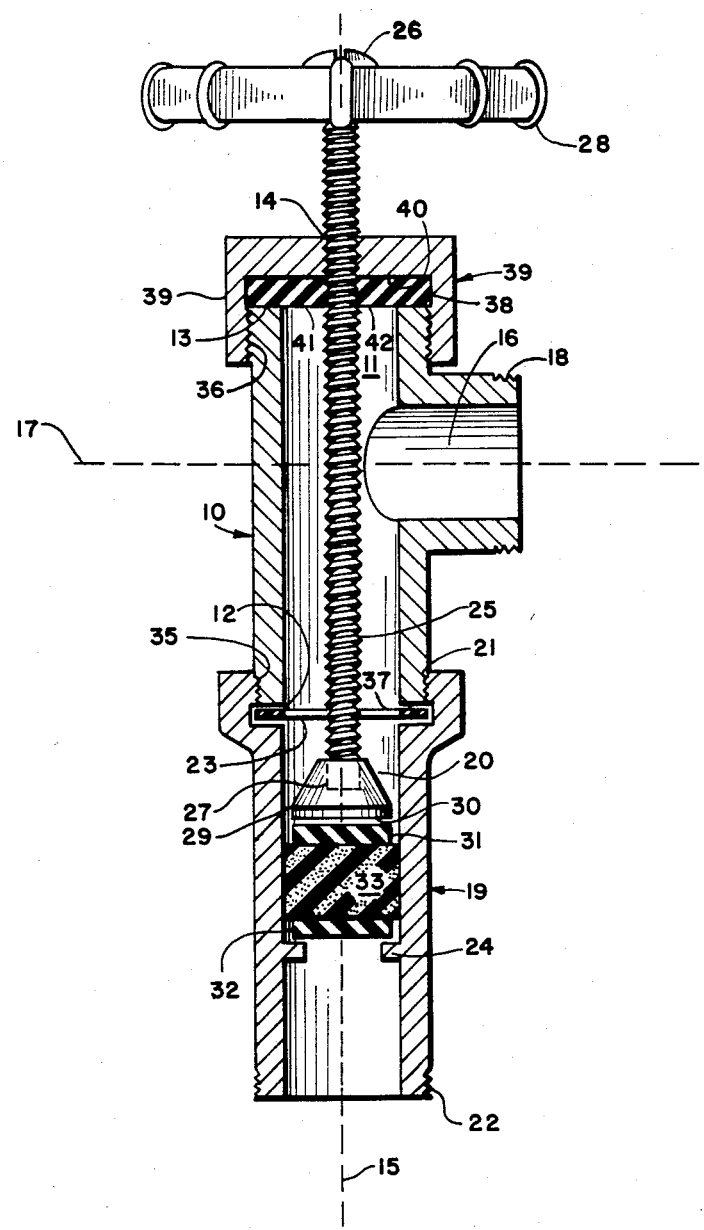
FIG. 2 is a longitudinal sectional view of the valve of FIG. 1.

For convenience in description, the terms "lower" and "upper", or words of similar import, will have reference to the lower and upper ends, respectively, of the valve appearing in FIG. 2.

DESCRIPTION OF THE PREFERRED EMBODIMENT

Figure 1:
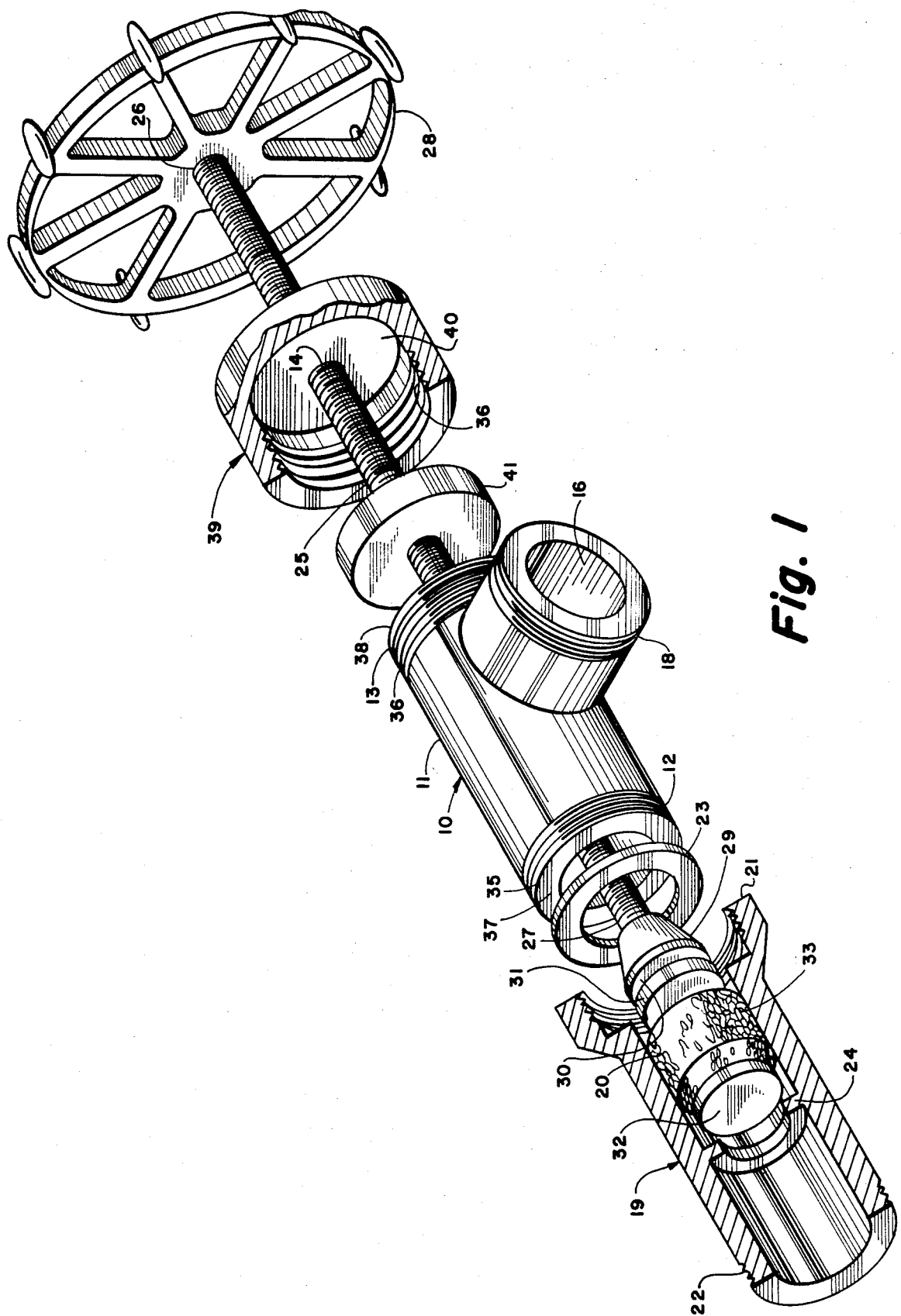
FIG. 1 is an exploded perspective view of an embodiment of the valve of the present invention with parts broken away to reveal interior detail.

Referring to FIGS. 1 and 2, an improved valve of the present invention is shown comprised of upper housing 10 which defines elongated main conduit 11 of cylindrical configuration having open lower extremity 12 and upper extremity 13, both extremities being of circular configuration and centered upon axis of elongation 15. Said lower and upper extremities are provided with annular flat abutment shoulders 37 and 38, respectively, lying in spaced-apart parallel planes perpendicular to axis 15, and are further provided with external threading 35 and 36, respectively.

A closure cap 39, having flat interior face 40 and provided with threaded center passageway 14, engages threading 36 of said upper housing and provides closure for the upper end of conduit 11. A flat resilient sealing gasket 41 having centered aperture 42 is adapted to rest upon abutment surface 38 and is further adapted to fit flush against the flat interior face 40 of said closure cap in a manner to prevent leakage of fluid from main conduit 11.

A side conduit 16, having a circular cylindrical configuration and center axis 17, communicates with main conduit 11 in a manner such that axes 15 and 17 intersect perpendicularly. Said side conduit terminates in threaded open distal extremity 18.

Lower housing 19, having circular cylindrical bore 20 centered on axis 15, terminates in open threaded upper extremity 21 and open threaded lower extremity 22. Upper extremity 21 engages threading 35 of said upper housing. An intervening resilient washer 23 is utilized to achieve a fluid-tight coupling between said upper and lower housings. A ring-like retaining shoulder 24, integral with said lower housing, protrudes inwardly into bore 20.

Threaded shaft 25, having first and second extremities 26 and 27 disposed respectively above and below said upper housing, threadably engages passageway 14, and penetrates aperture 42 in a fluid-tight manner. A manipulating handle 28 is affixed to first extremity 26 of said shaft. Second extremity 27 of said shaft engages foot 29 in a manner such that said foot swivels about said shaft upon axis 15. Said foot is provided with a flat lower face 30 of circular periphery and perpendicularly disposed to axis 15.

Upper and lower rigid porous boundary plates 31 and 32, respectively, are positioned within bore 20 in perpendicular alignment to axis 15. Both plates are of substantially identical circular disc-like configuration. Lower plate 32 is supported by retaining shoulder 24. Upper plate 31 lies in abutment with lower face 30 of foot 29, and is slideably positionable within bore 20.

A resilient porous filtering medium 33 is disposed between plates 31 and 32, filling the volume of bore 20 between said plates.

In operation, the valve is preferably incorporated into a fluid-conveying piping system such that lower extremity 22 of lower housing 19 is the inlet or upstream portal, and distal extremity 18 of side conduit 16 is the outlet or downstream portal. When handle 28 of shaft 25 is rotated in a clockwise manner, foot 29 is adapted to pass downwardly upon upper boundary plate 31 in a manner such that compressive force is applied to filtering medium 33. Said filtering medium is thereby compacted to a less porous configuration which causes a desired amount of occlusion of bore 20. Reversal of the direction of movement of foot 29 enables the resilient filter medium to resume its fully porous state, thereby permitting full flow of fluid through the valve.

When the filter medium becomes clogged with retained solid debris, the lower housing is disengaged from the upper housing to facilitate removal of the filter medium which may then be cleaned or replaced. The valve of this invention is particularly useful in controlling the rate of water delivery to a solar distillation apparatus.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A valve for controlling fluid flow at low flow rates comprising:
    (a) an upper housing comprising a main conduit of circular cylindrical configuration elongated about a center axis, and having an open lower threaded extremity and an upper extremity provided with closure means, and a side conduit of circular cylindrical configuration communicating with said main conduit and terminating in a threaded distal extremity,
    (b) a lower housing having a circular cylindrical bore terminating in open upper and lower threaded extremities, the upper extremity of said lower housing being adpated to releasably join in a fluid impervious manner with the lower extremity of said main conduit with alignment of said upper and lower housings upon said center axis, and retaining means inwardly protruding into said cylindrical bore,
    (c) a threaded shaft which extends through said closure means in threaded engagement therewith and in coaxial alignment with said center axis, having a first extremity disposed above said upper housing, and an opposed second extremity,
    (d) a manipulating handle affixed to the first extremity of said threaded shaft,
    (e) a foot is swiveled engagement with the second extremity of said threaded shaft and having a flat lower face of circular periphery perpendicularly disposed to said center axis,
    (f) upper and lower rigid porous boundary means of circular periphery perpendicularly disposed to said center axis and positioned within the bore of said lower housing, said lower boundary means being supported by said retaining means, and said upper boundary means lying in abutment with the lower face of said foot and slideably positionable within said bore, and
    (g) a resiliently compressable porous filtering medium disposed between said upper and lower boundary means, whereby
    (h) downward urging of said foot by said threaded shaft causes compression of said filtering medium which results in controlled occlusion of said cylindrical bore.

2. The valve of claim 1 wherein said filtering medium is an opencelled foam fabricated of a polymer having thermal and chemical resistance.

3. The valve of claim 1 wherein said filtering medium is comprised of fibrous material.

4. The valve of claim 1 wherein fluid is adapted to enter the lower extremity of the circular cylindrical bore, and exit the distal extremity of said side conduit.

* * * * *